HOBERT J. ASHER
INVENTOR.

BY Lester B. Clark
& Ray L. Smith

ATTORNEYS.

Oct. 31, 1950   H. J. ASHER   2,528,409
HOSE CONSTRUCTION

Filed Feb. 23, 1945   2 Sheets-Sheet 2

HOBERT J. ASHER
INVENTOR.

BY Lester B. Clark
& Ray L. Smith

ATTORNEYS.

Patented Oct. 31, 1950

2,528,409

UNITED STATES PATENT OFFICE 2,528,409

HOSE CONSTRUCTION

Hobert J. Asher, Bristow, Okla.

Application February 23, 1945, Serial No. 579,460

2 Claims. (Cl. 138—53)

This invention relates to hose, particularly to hose of the type which may be used as fire hose and for similar purposes and which may be folded flat when stowed.

In the fabrication of hose of the type indicated it has been a common practice to provide suitable lengths of tubular flexible casing, usually a heavy woven cotton fabric, and like lengths of tubular lining, such as rubber, to fit within the casing. The liner is then coated with a suitable cement whereupon it is drawn into the casing and is inflated to produce pressure between the lining and casing. Heat is then applied, usually through the use of live steam which is also used to supply the pressure to hold the elements in intimate contact during vulcanization of the lining to the interior wall of the casing.

It is desirable that hose of the type described be flexible when in use and also that it be so constructed that it may be stowed flat to facilitate stowage and conserve space. To accomplish these desirable characteristics, and others, it is the primary object of the invention to provide an improved hose, and an improved method of securing the tubular lining within a hose so that desirable flexibility is maintained, and yet undue stresses are avoided in any portion of the hose structure, either when in use or in storage.

Another object is to provide a hose which has desired durability and flexibility when used for its intended purpose.

A further object is to provide a hose in which a stencil ply is interposed between the tubular lining and the casing, such ply being so constructed and arranged that preselected portions of the surface of the lining are exposed to contact with, and secured to, the overlying casing.

Another and more specific object of the invention is to provide a hose in which stencil plies are applied to opposite sides of the hose lining, said lining having a coat of cement applied thereto whereby a bond is provided between the lining and the stencil ply, and also between the lining and the casing, at those areas exposed through or adjacent such ply.

The foregoing objects together with further objects will be more fully apparent from the following description taken in connection with the accompanying drawings in which.

Figures 1, 2:
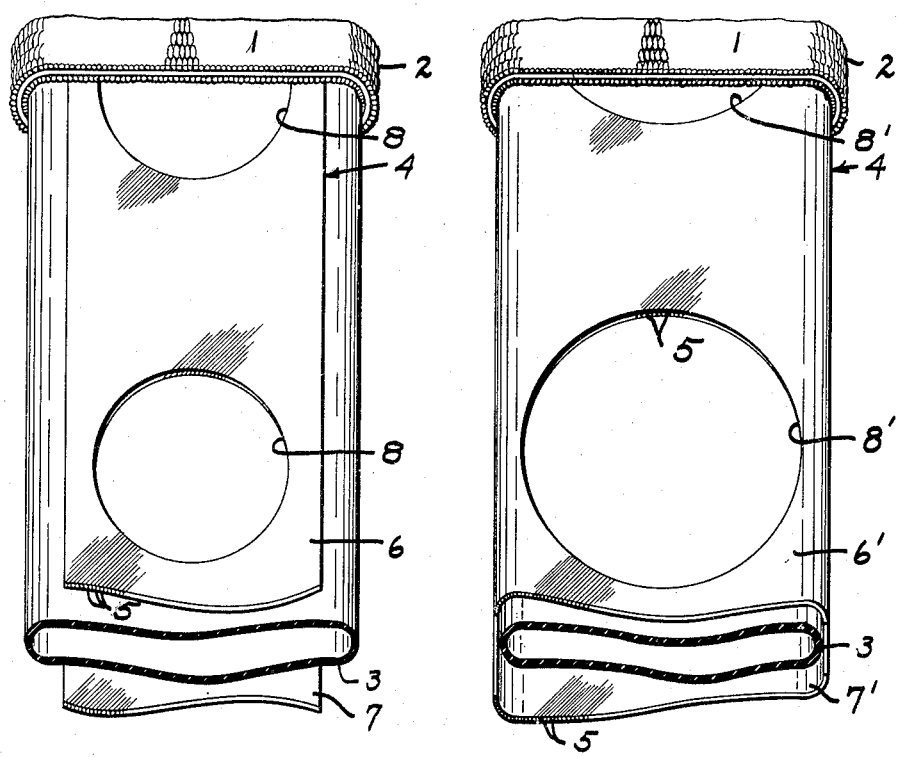
Fig. 1 is a cutaway view showing the hose construction in which one form of stencil ply is used.
Fig. 2 is an alternate embodiment illustrating the use of stencil plies which are substantially co-extensive with the periphery of the lining.

In the drawings there is shown at 1 the end of a length of heavy flexible casing which is creased at its edges at 2. It is intended that this casing shall be provided with an impervious tubular lining 3 which is of substantially the same size and configuration as the interior of the casing 1, and which shall be attached to the casing in a manner that desired characteristics in the completed hose shall be had.

To this end the present invention contemplates the use of a stencil ply, shown generally at 4, which is interposed between the casing 1 and the lining 3. This stencil ply may assume various forms as is illustrated in the respective figures of the drawings, to which reference will be specifically made.

The stencil ply 4 may comprise any suitable material, but is desirably of such construction, and so treated, that an intimate bond may be had between the stencil ply and the lining 3, and also that a minimum of abrasion results from movement between such material and the interior of the casing 1. To this end I preferably use a material comprising a rubberized bias-cut fabric, either woven or consisting in parallel strands 5 which are interbonded into a sheet form by the impregnating material thereof.

In the form of the invention shown in Fig. 1, the stencil ply 4 comprises elongated strips 6 and 7, each of which is provided with openings 8 at spaced intervals. In a hose of 2½-inches in diameter I prefer that the plies 6 and 7 shall be approximately 3½-inches in width, and that the openings 8 therein shall be approximately 2-inches in diameter, and spaced at 4-inch intervals. It is to be understood that these dimensions are given for purposes of illustration only. The essential feature is that the invention shall be carried out in such manner that the desired strength, durability, and ease of handling, and stowing shall be had.

Preliminary to the assembling of the casing 1 and the lining 3, the lining is first given one or more coats of a cement that will provide desired bonding between the lining and the superposed material. Preferably this cement is a vulcanizing cement so that bonding is effected through the application of both pressure and heat. After the cement has been applied, the respective plies 6 and 7 are brought into intimate engagement with the upper and lower surfaces of the lining whereby the lining and the stencil plies are held in assembled relation. The lining assembly is then drawn into the casing 1, and pressure and heat are applied to effect vulcanization between the lining 3 and the superposed materials throughout the periphery of the lining.

In accordance with the procedure just described, it seems apparent that the plies 6 and 7 are intimately bonded to the lining 3. It is also apparent that intimate bonding takes place between the lining 3 and the interior of the casing 1 in those areas which are not covered by the plies 6 and 7. Inasmuch as no cement is applied to the outer surface of the plies 6 and 7 no bond is effected between the outer surfaces of the plies and the wall of the casing 1.

In the hose constructed in the above manner, there is a lining-to-casing bond over a relatively small portion of the opposed lining and casing surfaces. Such area of bonding is sufficient, however, to avoid any wrinkling and resulting damage, to the lining when the hose is subjected to the stresses arising from normal use. The area of bonding along the edges 2 is relatively narrow. Inasmuch as the material of the lining is resilient, necessary deformation due to flattening of the hose for stowing or deformation required for flexing of the hose when in use can readily take place. At the same time, the hose possesses desired flexibility and minimizes the rate of deterioration from normal and intended use.

In the modification shown in Fig. 2 the stencil plies 6' and 7' are of sufficient width to completely or substantially overlie a diameter of the lining 3. In this embodiment the openings 8' in the stencil plies are made larger so that the percentage of interbonded area remains approximately the same as that in the construction shown in Fig. 1. If it is desired in this embodiment to provide some bonding at the edges 2, the width of the plies are adjusted accordingly. If such bonding is not desired, the plies 6' and 7' will be at least of the width of the diameter, of the lining 3 or may comprise a single piece of a width to completely surround the lining.

Figure 3:
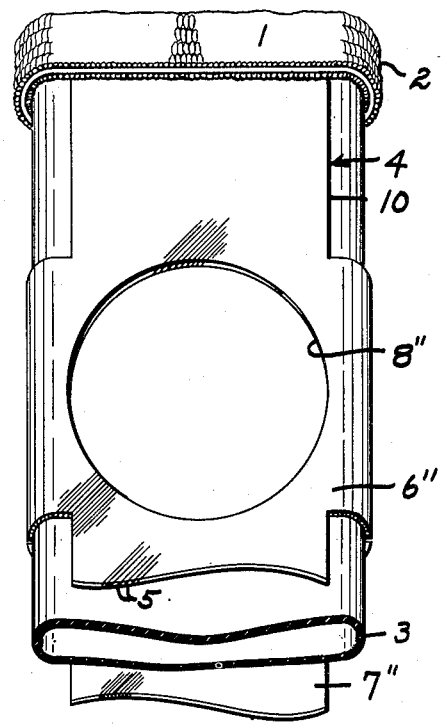
Fig. 3 shows a modification of the embodiment shown in Fig. 2, portions of the stencil ply being cut away to provide intermittent bonding of the edges of the lining to the casing.

Fig. 3 is a modification of the construction shown in Fig. 2. In this embodiment the stencil plies 6'' and 7'' are cut away at intervals along their edges as shown at 10. The openings 8'' are reduced somewhat in size from that shown in Fig. 2, and in this manner the percentage area of bonding of the liner 3 to the casing 1, as provided by the openings 8'' and the cut away areas 10, is substantially the same as that shown in the preceding Fig. 2. In the example given above, the area over which interbonding takes place between the lining 3 and the casing 1 is approximately twenty-five percent of the total peripheral area of the lining, although it is to be understood that the invention is not confined to this specific percentage of bonding area.

Figure 4:
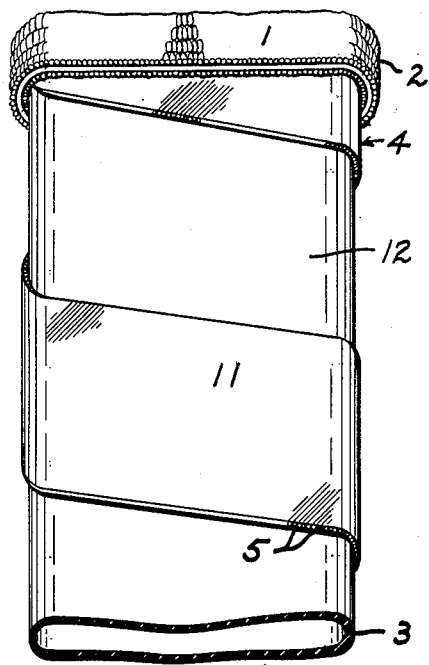
Fig. 4 illustrates the use of a stencil ply which is wound spirally about the hose lining.

In the embodiment of Fig. 4 the stencil ply 4 is shown as a single strip 11 which is wound spirally about the lining 3 at such a pitch that the exposed area 12 provides adequate interbonding between the lining and the casing 1, but which, at the same time, provides desirable flexibility and other characteristics of the hose.

From the foregoing description there is shown a novel hose construction and method of making, whereby there is provided desired characteristics in a hose of the type and for the purposes described.

Broadly the invention comprehends a hose, and method of making, whereby difficulties heretofore experienced are minimized.

The invention claimed is:

1. A hose comprising a creased flexible casing of woven fibrous material, a tubular lining therein of impermeable material, a perforated stencil ply extending longitudinally of and interposed between said lining and casing and of a width that the lining and casing are interbonded only at the creased edges thereof throughout the length of the hose and at the perforation of the ply.

2. A hose comprising a creased, flexible casing of woven fibrous material, a tubular lining therein of impermeable material, and means for interbonding said lining with the casing only at the creased edges and at spaced areas between said edges and longitudinally of the casing.

HOBERT J. ASHER.

REFERENCES CITED

The following references are of record in the file of this patent:

UNITED STATES PATENTS

| Number | Name | Date |
|---|---|---|
| 214,083 | Beardmore | Apr. 8, 1879 |
| 386,306 | Emerson et al. | July 17, 1888 |
| 1,100,829 | Joseph | June 23, 1914 |
| 1,104,508 | Huthsing | July 21, 1914 |
| 1,164,304 | Nicewarner | Dec. 14, 1915 |
| 1,220,661 | Many | Mar. 27, 1917 |
| 1,769,598 | Neidich | July 1, 1930 |
| 2,035,736 | Baird | Mar. 31, 1936 |
| 2,077,514 | Callahan | Apr. 20, 1937 |
| 2,273,736 | Raymond et al. | Feb. 17, 1942 |
| 2,427,229 | Riley | Sept. 9, 1947 |

FOREIGN PATENTS

| Number | Country | Date |
|---|---|---|
| 549,902 | Great Britain | Dec. 14, 1942 |